July 10, 1945.   A. M. SASGEN   2,379,992
WORK SUPPORTING AND FINISHING APPARATUS
Filed July 9, 1943   3 Sheets-Sheet 1
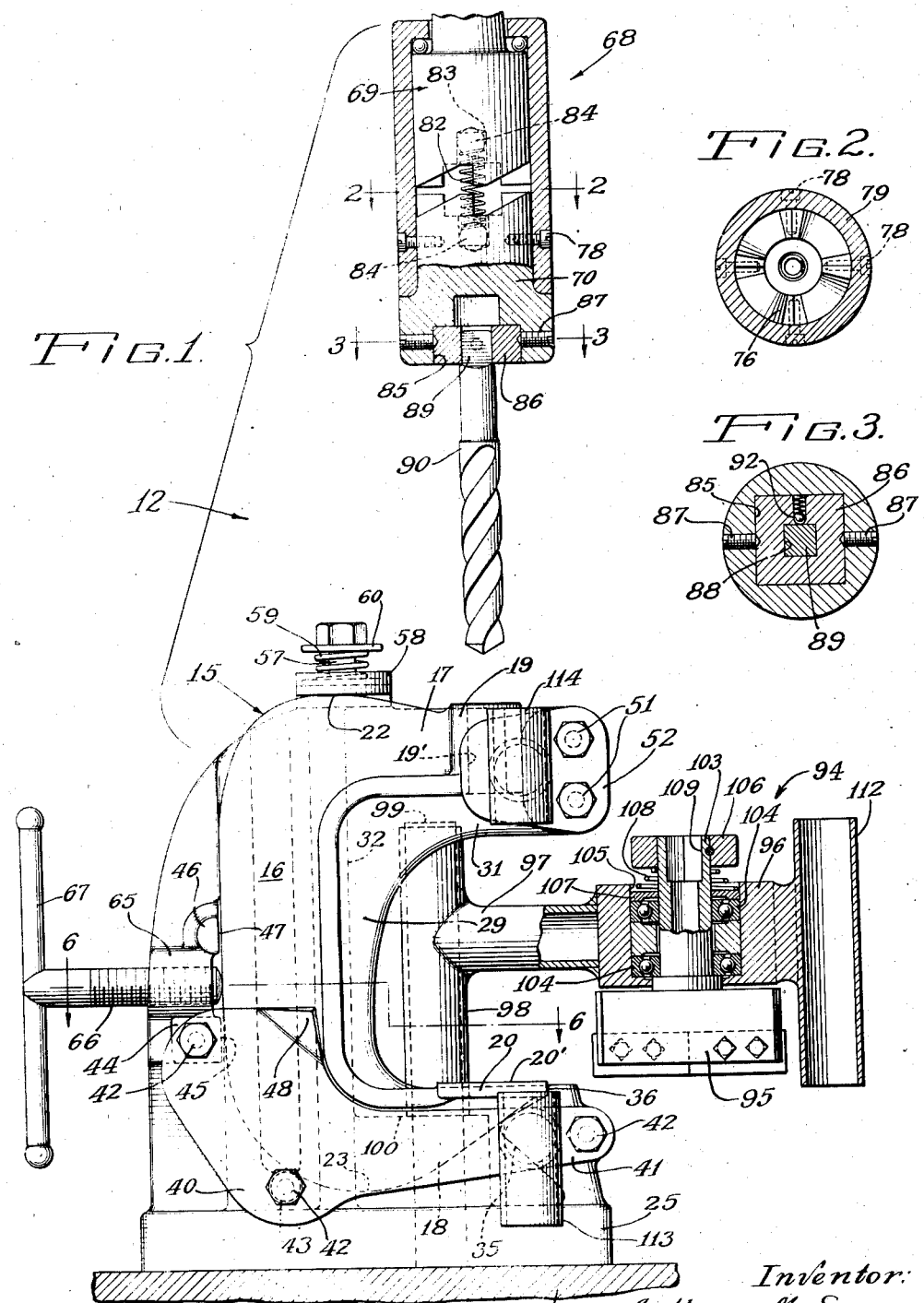
Inventor:
Anthony M. Sasgen
By Wallace and Cannon
Attorneys July 10, 1945.    A. M. SASGEN    2,379,992
WORK SUPPORTING AND FINISHING APPARATUS
Filed July 9, 1943    3 Sheets-Sheet 2
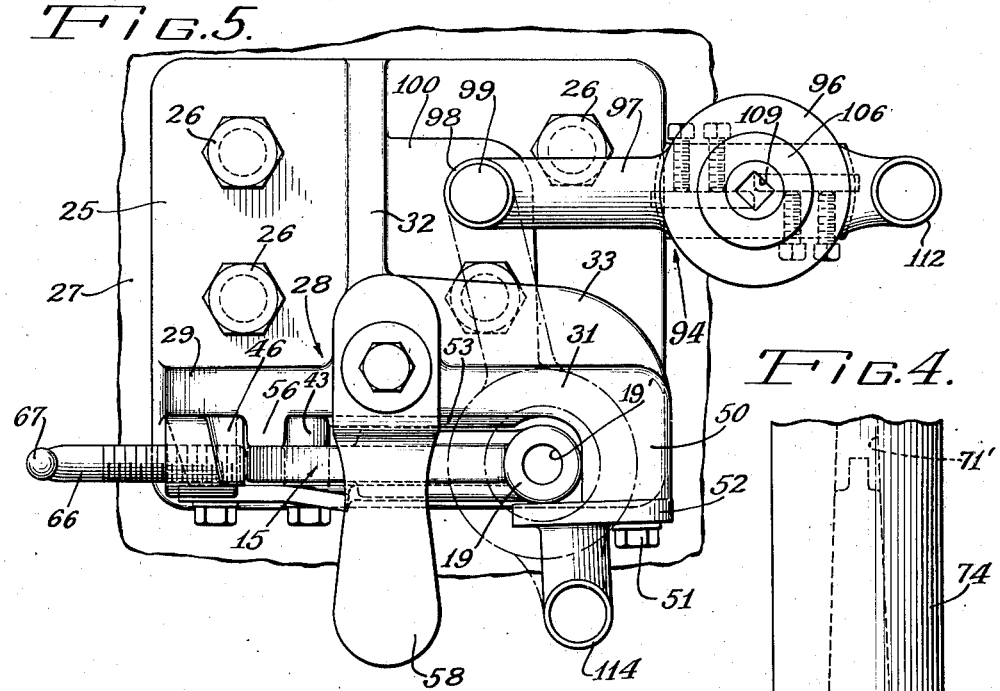
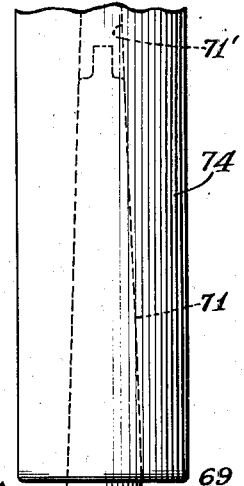
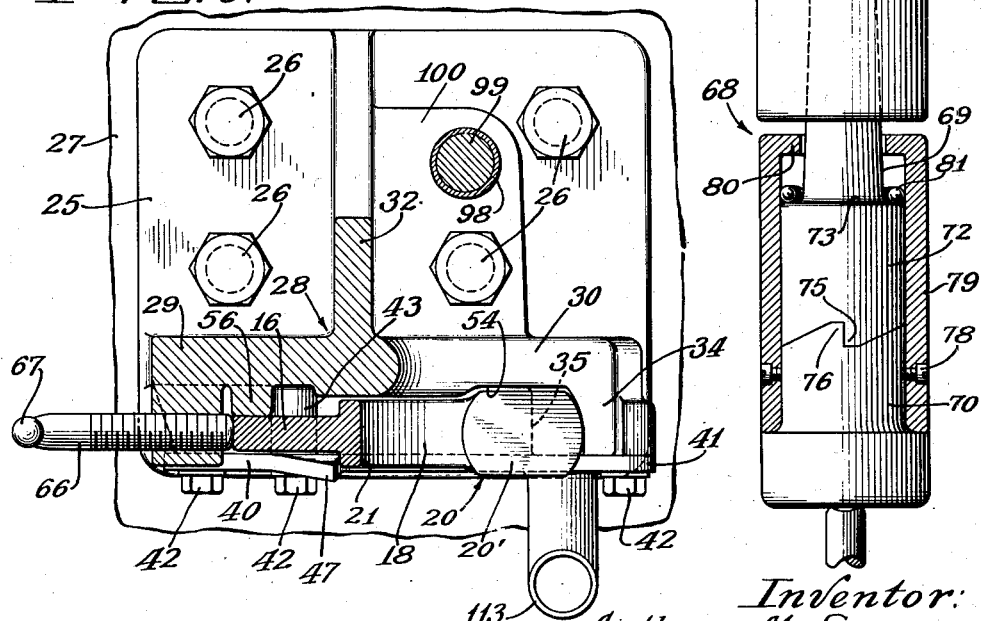
Inventor:
Anthony M. Sasgen
By Wallace and Cannon
Attorneys

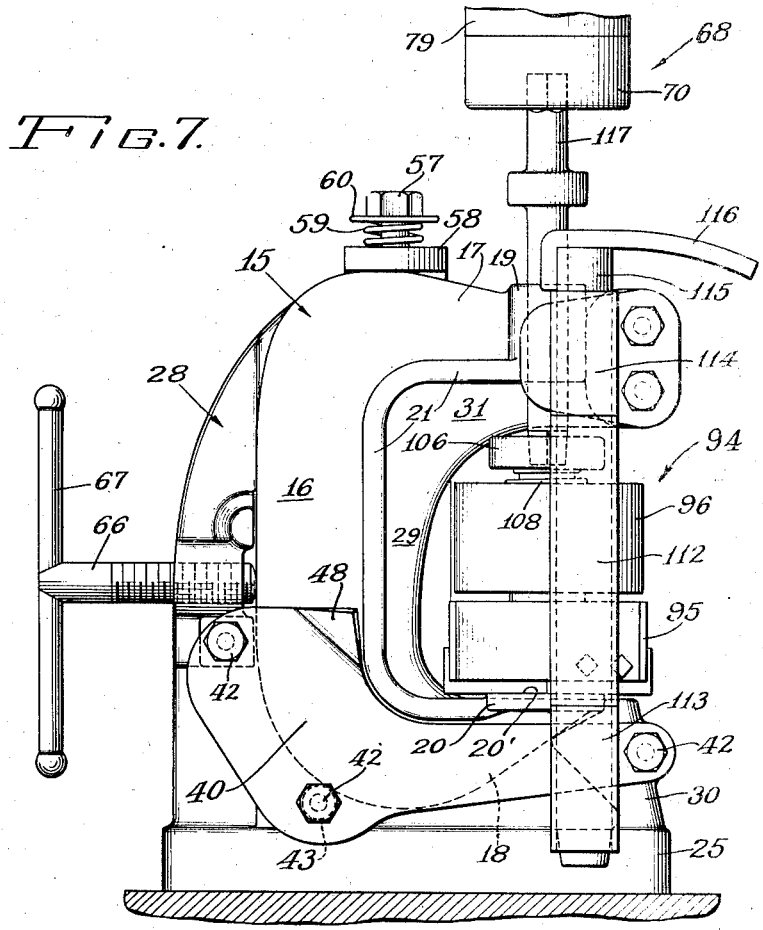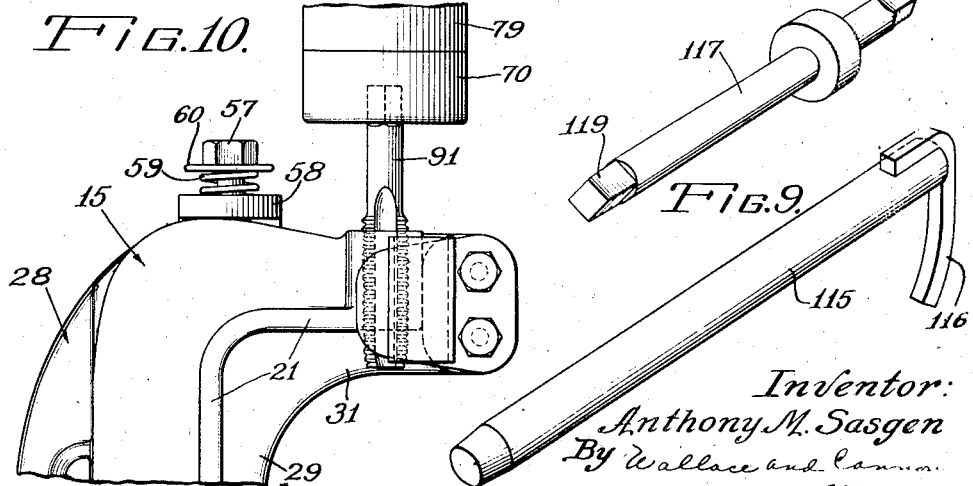

Patented July 10, 1945

2,379,992

UNITED STATES PATENT OFFICE 2,379,992

WORK SUPPORTING AND FINISHING APPARATUS

Anthony M. Sasgen, Chicago, Ill., assignor to Grand Specialties Company, Chicago, Ill., a corporation of Illinois Application July 9, 1943, Serial No. 493,975

12 Claims. (Cl. 29—26)

This invention relates to an apparatus for supporting and finishing a cast or otherwise formed work blank, and more particularly to an apparatus for supporting and finishing a C-shaped work blank such as the body member of a C-clamp.

C-clamp, as the name suggests, has a C-shaped frame or body member which affords two arms projecting from opposite ends of a cross member, and one of these arms has a pad on its inner surface for engagement with one surface of the work to be clamped. The other arm of the C-shaped body has a clamping screw threaded therethrough so that a clamping foot carried on the inner end of the screw may be tightened toward the inner face of the first mentioned arm and against an oppositely facing surface of the work which is to be clamped. The C-shaped body of such a clamp is usually formed as a casting, which thereafter has one arm thereof drilled and tapped to receive the clamping screw, and has the other arm machined to provide a flat clamping surface on the pad at right angles to the axis of the screw. This flat surface must be truly at right angles to the axis of the clamping screw, and the attainment of this relationship has in the past entailed the performance of a plurality of machining operations which were difficult to coordinate in such a manner as to attain this desired relationship between the clamping surface and the clamping screw, and this has required an excessive amount of time and has resulted in the production of an excessive number of defective clamps.

It is an object of this invention, therefore, to facilitate the manufacture of C-clamps, and particuarly to facilitate the machine operations required thereon, and an object related to the foregoing is to enable a quick and accurate positioning of the C-clamp body member for each of the machine operations to be performed thereon.

Still another object of the invention is to accomplish the performance of all of the machining operations with but a single positioning or mounting of the C-clamp body member.

A further object is to accomplish the ready and accurate supporting of a C-clamp body member in a single position wherein one arm may be drilled and tapped, and wherein a milling cutter may be shifted into position and may be driven by the drill operating means to mill the desired flat surface on the pad of the other arm.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a fragmentary and composite view taken partially in front elevation and partially in section and showing an apparatus embodying the fetures of this invention.

Fig. 2 is a transverse sectional view taken along the line 2—2 of Fig. 1;

Fig. 3 is a transverse sectional view taken along the line 3—3 of Fig. 1;

Fig. 4 is a fragmentary view partially in elevation and partially in vertical section and showing the parts of the apparatus shown in the upper portion of Fig. 1;

Fig. 5 is a top plan view of the portion of the apparatus shown in the lower portion of Fig. 1;

Fig. 6 is a horizontal sectional view taken along the line 6—6 of Fig. 1;

Fig. 7 is a view similar to Fig. 1 showing the milling tool swung into its operative position;

Figs. 8 and 9 are perspective views of auxiliary parts of the apparatus employed as shown in Fig. 7 during performance of the milling operation; and Fig. 10 is a partial front elevational view illustrating the final threading operation.

For purposes of disclosure, the invention is shown in the drawings and will be described hereinafter as embodied in a work blank supporting and finishing apparatus 12 which is particularly adapted for supportig and finishing a C-shaped body member such as that used in a C-clamp. For a more ready understanding of the invention, such a C-shaped body member 15 is shown in the drawings in its operative supported or mounted position in the apparatus 12. The body member 15 is, as the name suggests, in the form of a C having an intermediate portion or back 16 and a pair of arms 17 and 18 extending at right angles to the intermediate portion 16. At its free end, the arm 17 is formed, as best shown in Figs. 1 and 5, with an enlarged cylindrical head 19 adapted to be drilled and threaded internally to receive the conventional tightening or pressure applying screw (not shown) of the completed C-clamp, while the arm 18 has a pad 20 formed thereon at its free end and on the side facing the head 19, as shown in Figs. 1 and 6. The body member 15 is usually produced as a casting and is so formed that the intermediate portion 16 and the arms 17 and 18, save for the enlargement at the ends thereof, are of elongated rectangular form is cross section, with the major dimension in the plane of the body member. To strengthen the body member 15 it is, throughout its inner periphery, formed with a transversely disposed flange 21 which imparts a generally T-shaped cross section to the body member 12, as clearly seen in Fig. 6. Thus the intermediate portion 16 as well as the arms 17 and 18 may be said to include a flange and a reinforcing rib, and as shown in Figs. 1 and 6, the ribs of the three elements of the body member 12 are integral and continuous. This rib portion varies in its outward extent from its point of joinder with the associated flange 21, and this results, as shown in Figs. 1 and 7, in the formation of high points 22 and 23 at the juncture of the intermediate portion 16 and the arms 17 and 18.

Completion of the cast body member 15 requires drilling of the cylindrical head 19 to form a bore 19' of the proper size, Fig. 5, tapping of the bore 19' to form internal threads in the bore, and milling the pad 20 to give the same a smooth, finished and plane surface 20' strictly at right angles to the axis of the bore 19' in the cylindrical head 19; and the accomplishment of these operations in a more expeditious and yet precise manner is a feature of this invention. To this end, the apparatus 12 comprises a combination work holder and tool supporting means and a driving means for the various tools employed in the different operations. The combination work holder and tool supporting means comprises a rectangular base 25 adapted to be secured as by bolts 26 to the bed 27 of a suitable machine such as a drill press. At the front of the base 25, as viewed in Fig. 1, is a work blank holder which is particularly designed for the reception of the C-clamp body member 15. This holder includes an upstanding side wall member 28 cast integrally with the base 25, and the member 28 is, in itself, generally C-shaped so as to afford an intermediate portion or back 29, a lower arm 30, and an upper arm 31, Figs. 1 and 5. The wall member 28 is disposed parallel with the front edge of the base 25 and is braced in a front to rear direction by a rearwardly extending rib 32, while the upper arm 31 is braced by a horizontally disposed web 33. At its end, the lower arm 30 has a forwardly projecting extension 34 provided with a lip 35 extending toward the main portion, that is, toward the left as viewed in Figs. 1 and 6. The lip 35 forms a support upon which the end portion of the arm 18 of the body member 15 may rest, and the lip 35 joins the extension 34 slightly below the top thereof so as to form a shoulder 36 which may function in the accurate positioning of the body member 15, as will presently become apparent.

The lower arm 30 of the side wall member 28 has a plate 40 secured thereto and cooperating therewith to form a pocket into which the lower arm 18 and a part of the intermediate portion 16 of the body member 15 may quickly be dropped, and this plate 40 has a finger-like extension 41 which is disposed generally parallel to the lower arm 30 but in spaced relation thereto so as to form the desired work receiving pocket. The plate 40 is preferably secured in position by a plurality of bolts 42. One of the bolts 42 is threaded through the extension 41 of the plate 40 and into the extension 34 of the arm 30, another is threaded into a boss 43, and a third is threaded into a lug 44. The boss 43 projects forwardly from the member 28 near the base 25 and well to the left of the center of the member 28, as viewed in Fig. 1. In addition to receiving one of the bolts 42, the boss 43 acts as a supporting and guiding means for a body member 15 placed in the holder. The lug 44 projects forwardly from the extreme left of the member 28 and, in addition to receiving one of the bolts 42, provides a guide surface 45 against which the back portion 16 of the body member 15 may initially rest. A second such lug 46, having a similar guide surface 47, projects from the portion 28 somewhat above the lug 44. The upper, inner corner 48 of the plate 40 is preferably bent outwardly so as to facilitate the guiding of the body member 15 into the pocket.

The upper arm 31 of the member 28 is, like the arm 30, formed at its end with a forwardly projecting extension 50, and secured to the front face of the extension 50, as by bolts 51, is a small plate 52. The plate 52 extends to the left beyond the extension 50 to form a socket for the reception of the cylindrical head 19 of a C-clamp body member 15.

To aid further in the correct, accurate and rapid positioning of a C-clamp body member 15 in the holder, the upper arm 31 is, over a portion of its length, formed with a slight inward bulge 53, disposed so as to be approximately opposite the flange 21 of the upper arm 17 of a C-clamp body member mounted in the holder. The lower arm 30 of the member 28 is also made wide enough to lie closely adjacent the flange 21 of the lower arm 18 of a body member, and is cut away at 54, Fig. 6, to accommodate the pad 20. Positioned just to the right of the lugs 44 and 46 is a vertical rib 56 which projects forwardly beyond either the bulge 53 or the forward face of the lower arm 30 so as to cooperate with the plate 40 to form a guide channel for the narrow, rectangular portion 16 of the C-clamp body member.

It is believed apparent from the foregoing that a C-clamp body member 15 may be quickly inserted into a vertical position in the holder simply by moving the body member downwardly into the holder with the arm 18 at the bottom. Since the pad 20 is too large to pass through the socket formed by the plate 52 and the upper arm 31 of the holder, a body member 15 to be inserted in the holder is brought to a position parallel with the member 28, with the arm 18 just high enough to clear the plate 40 and with the arm 17 disposed above the arm 31 of the holder. In this way the pad 20 need not pass through the socket formed by the plate 52 and the arm 31, and at the same time the distance that the body member 15 travels is cut in half so as to reduce the time of insertion. This starting position also facilitates the entry of the arm 18 into the pocket formed between the plate 40 and the member 28, for the workman can, with the aid of the bent corner 48, easily strike the opening of the pocket. The body member 15 is then permitted to drop and is guided by the lugs 44 and 46, the rib 56, and the arms 30 and 31 so that it moves into substantially the position shown in Fig. 1, and this takes place quickly and without precise adjustment or manipulation. In this position the body member 15 is supported by the lip 35 and the boss 43, the boss 43 being engaged by the rounded corner of the body member 15 which serves to cam the body member to the right to the limit permitted by engagement of the pad 20 with the shoulder 36. The body member 15 is guided in a front to rear direction by the rib 56 and by the upper socket and pocket formed, respectively, by the upper arm and the lower arm of the member 28 and attached parts, and is guided and located in a right to left direction by the extensions 34 and 50 on the arms of the holder and by the lugs 44 and 46.

While the body member 15 is thus quite firmly and accurately held in position, the holder is preferably provided with means for clamping the body member in the holder. A first such clamping means serves yieldably to retain the body member in the holder, and for this purpose a clamping bar 58 is mounted on the upper arm 31 of the holder by means including a pivot bolt 57 which serves as a vertical pivotal axis for the clamping bar 58. The clamping bar 58 is urged downwardly by a compression spring 59 disposed about the bolt 57 and acting between the bar 58 and a washer 60 to press the clamping bar toward a horizontal position. The clamping bar 58 is adapted to be swung over the upper arm 17 of the body member 15 until it comes to rest in engagement with the high spot 22, and inasmuch as the body member 15 is rounded or inclined downwardly away from the high spot 22, a comparatively strong spring 59 may be employed, for the rounded or sloping surfaces immediately adjacent the high spot 22 function as cam surfaces, and hence the attendant needs merely to apply the necessary force to swing the clamping bar 58 from an inoperative position, parallel to the arm 31, to its operative position, shown in Figs. 1, 5, 7 and 10.

Additional clamping means are provided for assuring accurate positioning of the body member in a horizontal direction with respect to the holder, and to this end the member 28, intermediate the lugs 44 and 46, is formed with a boss 65 having a horizontal threaded bore to receive a clamping screw 66. The screw 66 is arranged to bear at its inner end against the back 16 of the body member 15 and by means of a transverse handle 67, the clamping screw 66 may be operated to force the entire body member 15 to the right to the limit of movement determined by engagement of the pad 20 with the shoulder 36 and engagement of the cylindrical head 19 with the extension 50. The body member will thus be positioned as shown in Figs. 1, 5 and 7.

This position in which the C-clamp body member 15 is thus located is such that it serves as the position of the body member for all of the machining operations to be performed thereon. These operations, as above stated, include drilling the bore 19' in the cylindrical head 19, forming an internal thread in the bore 19', and finishing the face 20' of the pad 20 so that this face is smooth and disposed at right angles to the axis of the bore 19'. To drive all of the tools required in the finishing operations, and to support some of the tools, a driving means 68, Figs. 1 and 4, is provided. This driving means, for the purpose of expediting the finishing operations, includes an automatically disengageable clutch. To that end, the driving means 68 is composed of a driving part 69 and a driven part 70. The driving part 69 is in the form of an arbor having a conventional, tapered shank 71 and a cylindrical portion 72 forming an upwardly facing annular shoulder 73. The tapered shank 71 is adapted to be inserted in conventional manner into the tapered recess 71' in a tool spindle 74 of the drill press or other machine, on the bed 27 of which the combination work blank and tool support is mounted. The cylindrical portion 72 terminates at its lower end in clutch jaws or teeth 75, and these teeth 75 are adapted to drivingly engage complementary teeth 76 formed on the upper end of the cylindrical driven member 70. The member 70 has a sleeve 79 secured thereto, as by screws 78, and this sleeve 79 slidably surrounds the cylindrical portion 72 of the driving part 69. At its upper end the sleeve 79 has an inturned annular flange 80 which loosely surrounds the tapered portion 71 so as to permit of limited longitudinal movement of the driving and driven parts relative to one another. Ball bearings 81 are disposed about the tapered portion 71 and on the shoulder 73 so as to be held in place by the sleeve 79, and these bearings serve at certain times to support the sleeve 79. The driving and driven parts are, as best seen in Fig. 1, normally urged apart by a compression spring 82. To accommodate the spring, each part has an axial recess 83 formed therein to receive bearing balls 84 as well as the ends of the spring 82. The spring 82 is strong enough to disengage the parts but when the spindle 74 is forced or fed downwardly during the actual drilling, tapping or milling operations, the spring is compressed and the clutch is engaged so as to rotate the driven part 70 thereof.

The lower or outer end face of the member 70 is formed with a square recess 85 to receive squared tool retainer 86 which is held in place in the recess 85 by means such as a pair of set screws 87. The tool retainer 86 has a square opening or socket 88 formed therein for the reception of the squared end 89 of the shank of a tool, such as a drill 90, shown in Fig. 1, or a tap 91, shown in Fig. 10. The tool retainer 86 carries the conventional spring pressed ball detent 92 for engaging the surface of the squared shank of the tool for the purpose of yieldably holding the tool in the retainer.

For the drilling of a bore 19' in the cylindrical enlargement 19, a drill 90 is inserted in the driving means 68, as shown in Fig. 1, while, for forming an internal thread within the bore, a tap 91 is substituted for the drill, as shown in Fig. 10. In both operations, the tool is both driven and supported by the driving means 68, and both operations are performed upon the same part of the frame member 15, thus readily making possible the performance of both operations with the body member held in one ad the same position. The remaining operation, namely, the finishing of the pad 20, has in the past required a change in the position of the body member 15, and hence required the expenditure of much time and effort in readjusting the body member so as to obtain a pad 20 with its finished surface 20' disposed at right angles to the center line of the bore 19' in the cylindrical head 19.

In accordance with this invention provision is made whereby the pad 20 may also be finished while the body member 15 remains in one and the same position which it occupies during the drilling and tapping operations. To that end, the combination work blank and tool supporting means includes a tool support 94 which carries a milling cutter 95, and the tool support 94 is so mounted as to afford an inoperative position wherein it does not interfere with the drilling or tapping operations or the insertion of a body member into the holder, and an operative position, wherein the tool may be driven from the tool spindle 74 to mill the surface of the pad 20. In the present case the tool support 94 is swingably mounted, and as shown in Fig. 1, the tool support comprises a main bearing block 96 having a T-member secured thereto, usually by welding. The cross bar 98 of the T-member is preferably tubular or is drilled to seat over a rod 99 upstanding from a raised portion or pad 100 of the base 25. The milling cutter 95 is carried on the lower end of a shaft 103 which is supported for longitudinal as well as rotational movement in the bearing block 96. To that end, the shaft 103 is supported in bearings 104 positioned in a cylindrical recess 105 in the bearing block 96. Carried on the end of the shaft 103 opposite the cutter 95 is a collar 106, and a spring 108 surrounds the shaft 103 between the collar 106 and a washer 107 which rests on the upper one of the bearings 104. The spring 108 is of such a strength as to overcome the weight of the cutter 95 and thus normally hold the same in the elevated or withdrawn position shown in Fig. 1. The upper end of the shaft 103 is formed with a squared recess or socket 109 to receive a driving shaft, as will presently be disclosed.

When the milling cutter 95 is not in use it is disposed in the out of the way position shown in Figs. 1 and 5, and when a milling operation is to be performed, the tool carrier or support 94 is swung to the active position, shown in full lines in Fig. 7 and in dotted outline in Fig. 5. It will be observed in this connection that the height or overall length of the cutter 95 and its shaft 103 is such that the tool and the tool carrier will clear the adjacent surfaces of the work holder as well as the surfaces of the work. Thus the milling cutter is located over the pad 20, and to retain the milling cutter 95 accurately in this position over the pad 20, means are provided for locking the tool carrier 94 in that position. For this purpose the block 96 has a vertically disposed tube 112 secured on the side thereof which is most remote from the pivot 99. Likewise secured to each finger 41 and to the plate 52 are similar, vertically disposed tubes 113 and 114, respectively. The tubes 113 and 114 are in axial alignment and, when the milling cutter is in proper position over the pad 20 of a C-clamp body member 15 mounted in the holder, the tube 112 is disposed between and in axial alignment with the tubes 113 and 114. When in such alignment a locking pin 115, see Fig. 9, having a hand grip 116, may be passed through all three tubular members, to thereby retain the tool carrier 94 in its operative position. The pin 115 is, of course, proportioned to have a sliding fit within the tubes 112, 113 and 114.

When the milling cutter 95 is thus held in its operative position, the squared recess or socket 109 of the shaft 103 is disposed in axial alignment with the bore 19' that has previously been drilled in the cylindrical head 19. The milling cutter 95 may, therefore, be driven from the tool spindle 74 through the medium of an extension shaft 117, shown in Fig. 8, passing through the bore 19' in the head 19. This shaft 117 has a squared end 118 adapted to be received in the opening or socket 88 formed in the tool retainer 86 in place of the squared shank of a drill or a tap, and has a squared end 119 to non-rotatably engage in the squared recess or socket 109 in the shaft of the milling cutter.

In the use of the apparatus of this invention, the clamping bar 58 is swung parallel with the arm 31, the clamping screw 66 will be released, the milling cutter 95 is disposed in its inoperative position shown in Figs. 1 and 5, and the tool driving means 68 will be in a somewhat higher position relative to the work blank holder than that shown in Fig. 1. It will be assumed also that the spindle 74 of the machine is already rotating and that a drill 90 has been inserted in the driving means 68.

The operator now grasps an unfinished C-clamp body member 15, usually and preferably somewhere near the juncture of the arm 17 and the back 16, and places the body member parallel with and against the member 28, with the arm 18 intermediate the arms 30 and 31 of the member 28, and then releases the body member to permit it to drop into the pocket formed by the member 28 and the plate 40. This positioning of the C-clamp body member in the holder is customarily performed by the left hand, leaving the right hand free to swing the bar 58 from its inoperative position parallel to the arm 31 to its retaining or clamping position at right angles to the plane of the body member and the member 28, as shown in Figs. 1 and 5. The body member 15 is now securely clamped in the holder and is substantially in final and precise position because of the cam action of the boss 43 on the rounded corner of the body member, and the small clearances which are afforded between the body member and the pocket. While the operator, with his right hand, is swinging the bar 58 into position, the left hand may be employed to give the hand screw 66 a few turns, thereby completing the precise positioning of the body member in the holder, and attaining a tight clamping of the body member 15 in the holder.

The spindle 74 is now lowered, causing the drill 90 to contact the cylindrical head 19. This contact of the drill with the head 19 overcomes the spring 82 and forces the driven part 70 of the driving means 68 upwardly relative to the driving part to cause engagement of the clutch thereof. Further resistance of the cylindrical head 19 to penetration thereof by the drill 90 will, of course, maintain the clutch engaged until the drilling of the head is completed, whereupon the spring 82 will serve to disengage the jaws 75 and 76 so that the driven part 70 will come to rest, or at least be rotated only by the very slight frictional force transmitted through the ball bearings 81. The aforesaid boring operation is preferably in the nature of a finishing operation, a rough bore being formed in most instances in the course of the casting operation or by a previously performed rough boring operation.

The operator then causes the spindle 74 to be elevated, and without the necessity of stopping rotation of the spindle may grasp the drill 90, withdraw it from the tool retainer 85, and insert the extension shaft 117. As above stated, this may all be done without arresting rotation of the spindle 74 and yet may be done with complete safety to the operator, because of the automatically disengageable clutch incorporated in the driving means 68. Next the operator swings the milling cutter 95 into position over the pad 20, and locks the same in that position by inserting the pin 115 through the tubes 112, 113 and 114 which are now in axial alignment. The spindle 74 is then lowered or fed downwardly so that the extension shaft 117 passes through the bore 19' just drilled in the cylindrical head 19 and into engagement with the squared recess or socket 109 in the shaft 103 of the milling cutter. Continued downward movement of the spindle 74 compresses the spring 108 to cause the cutter 95 to engage the surface of the pad 20, and the reaction then causes the spring 82 of the driving means 68 to be overcome, thereby causing engagement of the clutch jaws 75 and 76 and resultant drive of the milling cutter.

After the milling operation has been performed, the spindle is again raised, which will disengage the extension shaft 117 from the milling cutter and withdraw it from the bore 19' in the cylindrical head 19. The operator then removes the pin 115, swings the milling cutter to its inoperative position, removes the extension shaft 117 from the tool retainer, and mounts the tap 91 in the tool retainer. The spindle is then lowered to perform the thread cutting operation, the driving clutch being closed in this instance in the same manner as in the previously described operations. When the tapping operation has been completed, the tap 91 is removed, the drill 90 again inserted, and the finished body member 15 is removed from the holder, leaving the apparatus ready to repeat the operation on another unfinished C-clamp body member.

It is believed apparent from the above description that the manufacture of C-clamps is hereby greatly expedited because of the increased facility with which the machining operations may be performed. Not only is the unfinished C-clamp body member quickly and accurately positioned for each of the operations to be performed thereon, but those operations have been made possible with but a single positioning or mounting of the C-clamp body member. This not only reduces the time required to perform the operations but assures an improved product because all possibility of error in the positioning of the body member for the different yet related operations is eliminated.

Hence, while I have illustrated and described the preferred embodiment of my invention, it is to be understood that it is capable of variation and modification and I therefore do not wish to be limited to the precise details set forth, but desire to avail myself of such changes and alterations as fall within the purview of the following claims.

I claim:

1. In a work blank finishing apparatus, a supporting means comprising a base and a work blank holder mounted on said base, a rotary and axially movable tool supporting and driving means positioned to have a tool supported and driven thereby operate upon a work blank mounted in said holder, an auxiliary tool support pivotally mounted on said base, a rotary cutting tool mounted in said auxiliary support for rotation and for limited axial movement, spring means urging said cutting tool to a withdrawn position, said auxiliary support having an inoperative position and an operative position wherein the rotary cutting tool carried thereby is in position when shifted axially to act on a work blank in the holder while the work blank remains in the same position had during the performance of the other operation thereon, and means interchangeable with the tool carried by said tool supporting and driving means and forming a connection therefrom to the tool in said auxiliary support for rotatively driving said tool in said auxiliary support and for shifting the same axially into cooperative engagement with the work blank.

2. In an apparatus for performing operations on a C-clamp body member including drilling a bore in one arm of the body member and milling a flat surface on the other arm of the body member, a holder for supporting a body member in a fixed and predetermined position, driving means operable to support and drive a tool for drilling the bore in one arm of a body member, a tool support, a rotary face milling tool mounted on said tool support for axial movement from a normal retracted position to an advanced operative position for milling the flat surface on the other arm of a body member, said support being pivotally mounted in conjunction with said holder and being swingable from an inoperative position wherein the rotary tool is in an out-of-the-way position to an operative position wherein the rotary tool is positioned between the arms of a body member mounted in said holder, and means insertable in said tool driving means in place of a tool so as to extend through the bore in said one arm of a body member mounted in said holder and drivingly engage and thereby drive said milling cutter and advance the same to its operative position.

3. In an apparatus for performing operations on a C-clamp body member including drilling a bore in one arm of the body member and milling a flat surface on the other arm of the body member, a holder for supporting a body member in a fixed and predetermined position, driving means operable to support a tool for drilling the bore in one arm of the body member, a tool support for axial movement from a normal retracted position to an advanced working position, a rotary tool journaled in said tool support and having a shaft with a recess formed in one end thereof, said tool support being pivotally mounted in conjunction with said holder and having an inoperative position wherein the rotary tool carried thereby is in an out-of-the-way position and an operative position wherein the rotary cutter is located between the arms of a body member mounted in said holder with the cutter directed to perform its finishing operation and the recessed end of the cutter shaft directed toward and in axial alignment with the bore formed in the one arm of the body member, and means insertable in the driving means and adapted to pass through the bore in the one arm of the body member and into driving engagement with the recessed shaft of the rotary cutter to rotate said cutter and advance the same axially to its advanced working position.

4. In a work blank finishing apparatus, a supporting means comprising a base and a work blank holder mounted on said base, a rotary and axially movable tool supporting and driving means positioned to have a tool supported and driven thereby operate upon a work blank mounted in said holder, said tool driving means including a normally disengaged clutch engageable by the reaction resulting from operative contact of a tool driven by said driving means with a work blank, an auxiliary tool support pivotally mounted on said base, a rotary cutting tool mounted in said auxiliary support for rotation and for limited axial movement, spring means urging said cutting tool to a withdrawn position, said auxiliary support having an inoperative position and an operative position wherein the rotary cutting tool carried thereby is in position when shifted axially to act on a work blank in the holder while the work blank remains in the same position had during the performance of the other operation thereon, and means interchangeable with the tool carried by said tool supporting and driving means and forming a driving connection therefrom to the tool in said auxiliary support.

5. In an apparatus for performing machining operations on a C-clamp body member, a holder for supporting a C-clamp body member in a fixed and predetermined position, a tool support pivotally mounted in conjunction with said holder, a milling cutter mounted in said support for rotational and limited axial movement, a spring tending to withdraw said cutter axially from a cutting position, said support being swingable from an inoperative out-of-the-way position to an operative position wherein the milling cutter carried thereby is in position to act on a particular surface of a C-clamp body member in said holder, a rotary and axially movable tool driving means including means for releasably retaining a tool and a normally disengaged clutch engageable by the reaction resulting from operative contact of a tool driven by said driving means with the C-clamp body member, and means insertable in the tool retaining means and operable upon axial movement of said driving means to engage and drive the milling cutter when in operative position.

6. In a finishing apparatus for a C-clamp body member, a holder for supporting a body member in upright position comprising a base, means on the base forming a pocket for the reception of one arm of a C-clamp body member including abutment means adapted to be engaged by the free end of the arm received in the pocket, means forming a socket for the reception of a portion of the remaining arm of a body member mounted in the holder and including abutment means adapted to be engaged by the free end of the last mentioned arm of the body member, both said pocket and said socket opening upwardly to permit mounting of a body member in the holder by simple vertical movement, means for latching a body member in the holder against vertical withdrawal therefrom, and means operable to force such a body member against said abutment means to accurately position and clamp the body member in a predetermined position in the holder.

7. In a finishing apparatus for a C-clamp body member a holder for a body member comprising a base, a C-shaped member upstanding from said base having a lower arm, an upper arm, an intermediate interconnecting portion, an extension on the upper arm projecting laterally of the plane of the member and an extension on the lower arm projecting in the same direction laterally of the plane of the member, a lug projecting from the intermediate portion of said member laterally of the plane of said member in the same direction as said extensions, a plate secured to said member in spaced relation thereto and cooperating with said lower arm extension and said lug to form an upwardly opening pocket for the reception of one arm of a C-clamp body member, a plate secured to the extension on the upper arm of said member and extending parallel with the arm to form an upwardly opening socket for the reception of the end of the other arm of a C-clamp body member mounted in the holder, and a retaining bar mounted at the top of said member and swingable to overlie a C-clamp body member mounted in the holder to maintain the C-clamp body member in the holder.

8. In an apparatus for finishing a C-clamp body member which has its inner surface defined by a flange and which has a continuous reinforcing rib extended outwardly from said flange so that the parts of body member are of T-shaped cross section, said finishing apparatus comprising a holder for such a body member having a base, a C-shaped member upstanding from said base and having a lower arm, an upper arm and an intermediate interconnecting portion, an extension on the upper arm projecting laterally of the plane of the member and an extension on the lower arm projecting in the same direction laterally of the plane of the member, a lug projecting from the interconnecting portion of said member intermediate the upper and lower arms and in the same direction laterally as said extensions, a plate having a finger-like extension secured to said member with the finger-like extension parallel with the lower arm, said plate together with said lower arm extension and said lug forming an upwardly opening pocket for the reception of one arm of a C-clamp body member with said plate so arranged as to engage surfaces of the reinforcing rib of a body member mounted in the holder, a vertically disposed positioning rib on the interconnecting portion of said upstanding member projecting toward said plate to form therewith a vertical guide passage for the reception of the reinforcing rib of the back of a C-clamp body member, a plate secured to the extension on the upper arm of said upstanding member and extending parallel with the arm to form an upwardly opening socket for the reception of the end of the other arm of a C-clamp body member mounted in the holder, and a retaining bar mounted at the top of said upstanding member and shiftable to overlie a C-clamp body member mounted in the holder to retain the same in said holder.

9. In an apparatus for finishing a C-clamp body member which has a cylindrical head at the end of one arm which is to be drilled and tapped and which has a pad on the other arm to be milled, said apparatus comprising a base, a C-shaped wall member upstanding from said base having a lower arm, an upper arm, and an intermediate interconnecting portion, an extension on the upper arm projecting laterally of the plane of the member and an extension on the lower arm projecting in the same direction laterally of the plane of the member, said last named extension including a lip-like projection parallel with the lower arm for engaging and supporting one arm of a C-clamp body member and merging with said extension short of the upper edge thereof to form a shoulder, a boss projecting from said member laterally of the plane thereof near said base, a lug projecting from the intermediate portion of said member laterally of the plane of said member in the same direction as said extensions, a plate secured to said member and cooperating with said lower arm extension and said lug to form an upwardly opening pocket for the reception of the pad-carrying arm of a C-clamp body member, said lip-like projection and said boss supporting a C-clamp body member with an edge of its pad abutting said shoulder on said lower arm extension, a plate secured to the extension on said upper arm and extending parallel therewith to form an upwardly opening socket for the reception of the cylindrical head of a C-clamp body member, a retaining member mounted at the top of said member and shiftable to overlie a C-clamp body member mounted in the holder to retain the body member in the holder, and a clamping screw mounted in said upstanding wall member and operable to abut a body member mounted in the holder at its intermediate portion to force the arms of a body member tightly against the lateral extensions on the arms of said upstanding wall member to thereby accurately locate such a body member in said holder.

10. In an apparatus for finishing the pad on one arm of a C-clamp body member, a holder for supporting a body member in upright position and with the pad-carrying arm lowermost, said holder comprising a base, means on the base forming a pocket for the reception of the pad-carrying arm of a C-clamp body member including limit means adapted to be engaged by the outermost edge of the pad, means forming a socket for the reception of a portion of the remaining arm of a body member mounted in the holder and including limit means adapted to be engaged by the free end of the last mentioned arm of the body member, both said pocket and said socket opening upwardly to enable mounting of a body member in the holder by simple downward movement, means for latching a body member in the holder against vertical withdrawal therefrom, means for accurately positioning and clamping the body member in the holder by forcing the same against said limit means, a milling cutter, a support for said cutter pivotally mounted on said base, said support having a normal inoperative position and an operative position wherein the milling cutter is positioned over the pad on a C-clamp body member in said holder, and means for locking the support in operative position.

11. In an apparatus for boring one arm of a C-clamp body member and for milling a flat surface on the other arm at right angles to the axis of the bore formed in the first mentioned arm, a combination body member and tool supporting means comprising a body member holder for stationarily supporting a C-clamp body member and a shiftable tool support, a milling cutter journaled for limited axial advancing movement in said tool support and having a shaft with a recess formed in the end thereof for the reception of a driving member, said tool support having a normal inoperative position and being shiftable to an operative position wherein the milling cutter is positioned between the arms of a C-clamp body member mounted in the holder with its cutting face opposite the surface to be milled and with its shaft in axial alignment with the bore formed in the first mentioned arm of the C-clamp body member to enable a driving member for said cutter to be extended through the bore in the arm of the body member.

12. In an apparatus for boring one arm of a C-clamp body member and for milling a flat surface on the other arm at right angles to the axis of the bore formed in the first mentioned arm, a combination body member and tool supporting means comprising a body member holder for stationarily supporting a C-clamp body member and a shiftable tool support, a milling cutter journaled in said tool support for rotational and limited axial movement and having a shaft with a recess formed in the end thereof for the reception of a driving member, a spring surrounding said shaft and urging said cutter to a withdrawn position, said tool support having a normal out-of-the-way inoperative position and being shiftable to an operative position wherein the milling cutter is positioned between the arms of a body member mounted in the holder with its cutting face opposite the surface to be milled and with its shaft in axial alignment with the bore formed in the first mentioned arm of the body member to receive a driving member extended through the bore in the arm of the body member.

ANTHONY M. SASGEN.